(12) United States Patent
Boron et al.

(10) Patent No.: US 11,673,515 B2
(45) Date of Patent: Jun. 13, 2023

(54) ARTICULATED STAND FOR HOLDING AN ELECTRONIC DEVICE

(71) Applicant: Aptiv Technologies Limited, St. Michael (BB)

(72) Inventors: Artur Boron, Czernichów (PL); Grzegorz Szostek, Morawica (PL)

(73) Assignee: Aptiv Technologies Limited., St. Michael (BB)

( * ) Notice: Subject to any disclaimer, the term of this patent is extended or adjusted under 35 U.S.C. 154(b) by 0 days.

(21) Appl. No.: 17/518,433

(22) Filed: Nov. 3, 2021

(65) Prior Publication Data

US 2022/0161739 A1 May 26, 2022

(30) Foreign Application Priority Data

Nov. 26, 2020 (GB) ...................................... 2018641

(51) Int. Cl.
*B60R 11/04* (2006.01)
*B60R 11/00* (2006.01)

(52) U.S. Cl.
CPC ....... *B60R 11/04* (2013.01); *B60R 2011/0033* (2013.01); *B60R 2011/0089* (2013.01); *B60R 2300/40* (2013.01)

(58) Field of Classification Search
CPC ..... B60R 1/04; B60R 1/12; B60R 2001/1215; B60R 11/04; B60R 2001/1253; B60R 2011/0033; B60R 2300/40; B60R 2300/408; F16C 11/0604; F16C 11/06; F16C 11/0614
USPC ........................................................ 348/148
See application file for complete search history.

(56) References Cited

U.S. PATENT DOCUMENTS

| | | | |
|---|---|---|---|
| 6,068,380 A * | 5/2000 | Lynn ......................... | B60R 1/04 359/872 |
| 6,642,840 B2 | 11/2003 | Lang et al. | |
| 8,201,800 B2 * | 6/2012 | Filipiak ..................... | B60R 1/04 248/483 |
| 8,602,456 B2 | 12/2013 | Bosscher et al. | |
| 8,896,700 B2 * | 11/2014 | Karner ................... | G09G 3/346 348/148 |
| 2002/0088916 A1 | 7/2002 | March et al. | |

(Continued)

FOREIGN PATENT DOCUMENTS

| | | |
|---|---|---|
| CN | 207916703 | 12/2018 |
| EP | 3078546 | 10/2016 |
| WO | 2014170467 A1 | 10/2014 |

OTHER PUBLICATIONS

"Extended European Search Report", EP Application No. 21210705.6, dated Apr. 29, 2022, 7 pages.

(Continued)

*Primary Examiner* — Nathnael Aynalem
(74) *Attorney, Agent, or Firm* — Sawtooth Patent Group PLLC

(57) ABSTRACT

An articulated stand including a first part and a second part. The first part is configured for holding an electronic device. The first part includes a ball pivot with a chamber and a connector. The chamber defined through the ball pivot. The connector accommodated at least partially in the chamber. The connector configured to electrically connect with a cable connector. The second part including a ball housing portion receiving the ball pivot to form a ball joint.

20 Claims, 2 Drawing Sheets

(56) References Cited

U.S. PATENT DOCUMENTS

| | | | |
|---|---|---|---|
| 2003/0086240 A1* | 5/2003 | Jobs | F16M 11/14 |
| | | | 248/278.1 |
| 2006/0061008 A1 | 3/2006 | Kamer et al. | |
| 2010/0085653 A1* | 4/2010 | Uken | B60R 1/04 |
| | | | 359/872 |
| 2010/0302661 A1* | 12/2010 | Lee | B60R 1/04 |
| | | | 359/872 |
| 2011/0223802 A1* | 9/2011 | Zeller | F16M 11/14 |
| | | | 439/529 |
| 2017/0313251 A1* | 11/2017 | Uken | B60R 1/088 |

OTHER PUBLICATIONS

"Search Report", GB Application No. 2018641.7, dated Apr. 14, 2021, 6 pages.

\* cited by examiner

ARTICULATED STAND FOR HOLDING AN ELECTRONIC DEVICE

CROSS-REFERENCE TO RELATED APPLICATION

This application claims priority to United Kingdom Patent Application Number GB2018641.7, filed Nov. 26, 2020, the disclosure of which is hereby incorporated by reference in its entirety herein.

BACKGROUND

Articulated stands are widely used in the fields of transportation, home accessories and industry, in order to hold objects such as electronic devices while allowing a wide range of movements in order to adapt to different persons or different situations. Articulated stands may include a ball joint as a reliable joint with several degrees of freedom.

In the automotive field, articulated stands can be used to hold an electronic appliance such as a smartphone, a display or a mirror including a camera or a display, such as a rearview mirror. A camera fixed to a mirror can be used to record traffic, as part of a self-driving system or to constitute a legal proof (so-called dashboard cam or "dashcam").

A camera fixed to a mirror such as an inside mirror may also be used to monitor the driver tiredness or behavior, in particular in the case of a self-driving system having an automation level of 2 to 4, requiring some involvement of the driver in the car driving. Finally, a camera fixed to an inside mirror may be used to monitor a passenger's behavior, for example in the case of a full self-driving vehicle.

In the above cases, the articulated stand requires a cable to provide power to the smartphone or the camera and to obtain the camera footage, the cable being preferably integrated in the articulated stand for aesthetical and durability reasons. However, introducing a cable through a ball joint is difficult, in particular for a thick cable such as a coaxial cable used for cameras.

There is thus a need to improve the state of the art. More precisely, there is a need to provide an articulated stand allowing a reliable electric connection of an electronic device that may be held by the articulated stand.

SUMMARY

The present disclosure concerns an articulated stand for holding an electronic device, the articulated stand having: a first part defining a ball pivot and suitable for holding the electronic device; and a second part having a ball housing portion receiving the ball pivot to form a ball joint; wherein the ball pivot has a chamber and a connector accommodated at least partially in the chamber, for plugging a cable connector through the ball pivot and the ball housing portion.

Such an articulated stand allows to easily connect electrically the electronic device thanks to the connector and through the chamber.

Advantageously, the second part has a passage opened on the chamber and on an outside and the passage has a width or diameter greater than a width or diameter of the chamber to allow the cable connector and preferably at least a part of a corresponding cable to be accommodated in the chamber and the passage, regardless of a position of the ball joint. Consequently, the connected cable may not be submitted to wear or disconnection, even when the ball joint is moved. Preferably, the chamber and/or the passage does not include a turn or a bend.

Advantageously, in a straight position of the ball joint, a longitudinal axis of the chamber is aligned with a longitudinal axis of the passage, which allows a simple connection of the electronic device and a cost-efficient design of the ball joint.

Advantageously, the second part further includes a fixing portion adapted to be fixed on a fixing surface. The fixing portion may have a longitudinal axis offset from a longitudinal axis of the chamber. Such an offset fixing portion facilitates a mounting step of the articulated stand on a fixing surface by providing an access to a fixing robot and/or an operator and by allowing a wide range of fixing means, such as screws, nuts, glue, snap-fitting or welding.

Advantageously, the second part defines a free space between the ball housing portion and the fixing portion or between the passage and the fixing portion. Such a free space is useful both to facilitate the mounting step and also to accommodate at least part of the cable. For example, an extra length of the cable may be accommodated or located into the free space in order to compensate for the movement of the ball joint.

Advantageously, the articulated stand further has a cable provided with the cable connector plugged to the connector of the first part through the ball joint and preferably with another cable connector plugged or fixed to or through the second part. Such an articulated stand further provides a ready to mount articulated stand and is ready to receive the electronic device.

Advantageously, the cable defines a loop between the cable connector and the other cable connector or between a first extremity and a second extremity of the cable. Preferably, the loop has a minimal radius greater than a bending radius of the cable. The diameter of the loop may vary according to the movement of the ball joint and the minimum radius of the loop may be equal to or greater than the minimal bending radius of the cable.

Advantageously, the cable connector is fully accommodated into the chamber. This provides a reliable connection of the cable. In addition, the chamber may have lockers or locking means adapted to maintain the cable connector into the chamber, or at least prevent an undesired unplugging of the cable connector.

Advantageously, the chamber is linear. This provides a cost-efficient articulated stand and facilitates plugging of the cable.

Advantageously, the ball pivot and/or the ball housing portion have a stopper limiting a relative movement of the first part with regard to the second part. An extra length of the cable and/or with the loop of the cable may be chosen according to the stopper in order to prevent any disconnection of the cable during a movement of the ball joint as well as to prevent damaging the cable by a flexion beyond the bending radius of the cable.

A second aspect of the disclosure concerns an articulated stand for an electronic device, having: a first part defining a ball pivot provided with a chamber, a second part having a ball housing portion receiving the ball pivot to form a ball joint and a passage opened to the chamber and to an outside, wherein the passage has a width or diameter greater than a width or diameter of the chamber to allow at least a part of a cable and/or of a cable connector to be accommodated through the chamber and the passage regardless of a position of the ball joint.

All other features of the first aspect may also be combined with this second aspect of the disclosure.

A third aspect of the disclosure concerns a vehicle integrating the articulated stand according to the first aspect or the second aspect of the disclosure.

Advantageously, the first part is provided with the electronic device that may have a camera, the camera may record or face the inside of the vehicle.

Advantageously, the second part is fixed to a windshield or an interior roof of the vehicle.

A fourth aspect of the disclosure is a mounting or fixing method for an electronic device including the steps of: Providing an articulated stand according to the first aspect or the second aspect of the disclosure; Fixing an electronic device to the first part; Fixing the second part to a fixing surface; and Connecting a cable to the electronic device through the chamber.

Advantageously, the second part has a passage opened on the chamber and on an outside and the step of connecting the cable is also performed through the passage.

Advantageously, the passage has a width or diameter greater than a width or diameter of the chamber to allow the first cable connector and a corresponding cable to be accommodated in the chamber and the passage, regardless of a position of the ball joint.

Advantageously, the cable is connected to the electronic device through a cable connector that may be partially or totally accommodated into the chamber and to another cable connector that may be provided on or through the fixing surface.

Advantageously, the cable is connected in order to define a loop between the cable connector and the other cable connector.

Advantageously, the fixing surface is an exterior or an interior surface of a vehicle.

BRIEF DESCRIPTION OF THE DRAWINGS

Other features, purposes and advantages of the disclosure will become more explicit by means of reading the detailed statement of the non-restrictive embodiments made with reference to the accompanying drawings.

DETAILED DESCRIPTION

The present disclosure relates to an articulated stand adapted to hold any kind of electronic device, such as a screen, a camera, a smartphone, one or several sensors, a computer or a tablet. In an embodiment, the present articulated stand holds a rearview mirror for the interior of a vehicle, the rearview mirror being provided with a screen and/or a camera.

Figure 1:
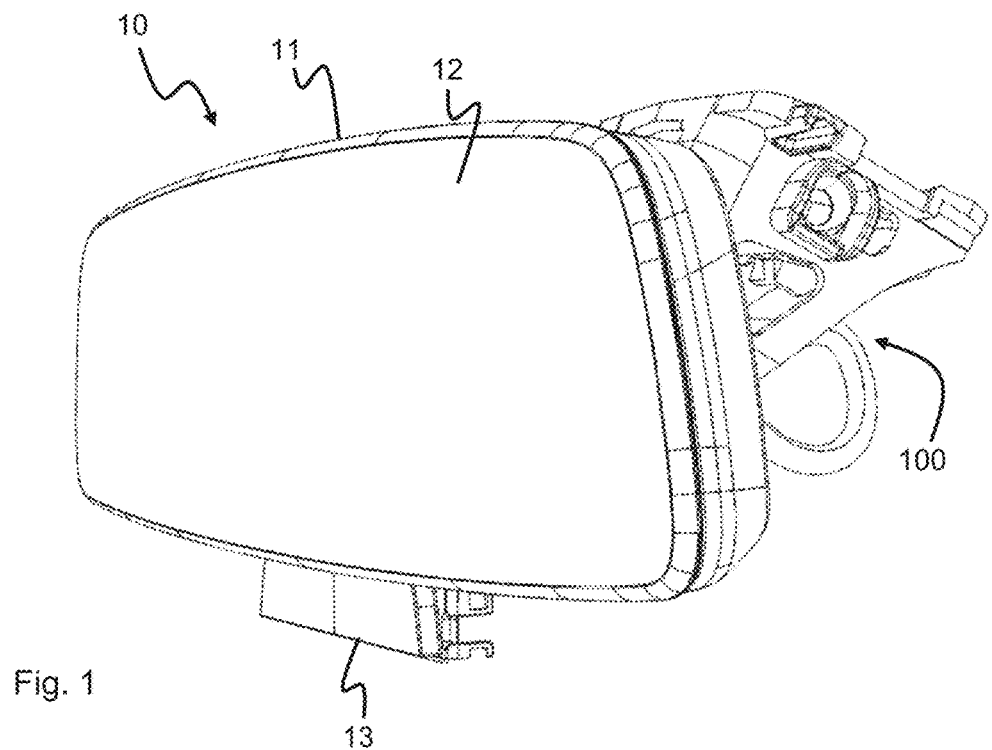
FIG. 1 is a front perspective view that shows a rearview mirror having an electronic device, the rearview mirror being mounted on an articulated stand according to the present disclosure.

FIG. 1 shows a rearview mirror 10, including a mirror body 11, a mirror surface 12, a front panel 13 and an articulated stand 100. The front panel 13 and/or the mirror body 11 can accommodate any electronic device. For example, a screen and/or light indicators can be embedded in the front panel 13. Preferably, a camera is embedded into the front panel 13. Such a rearview mirror 10 is intended to be fixed in the interior of a car, for example to the windshield or to the car interior roof, as it is known.

Figure 2:
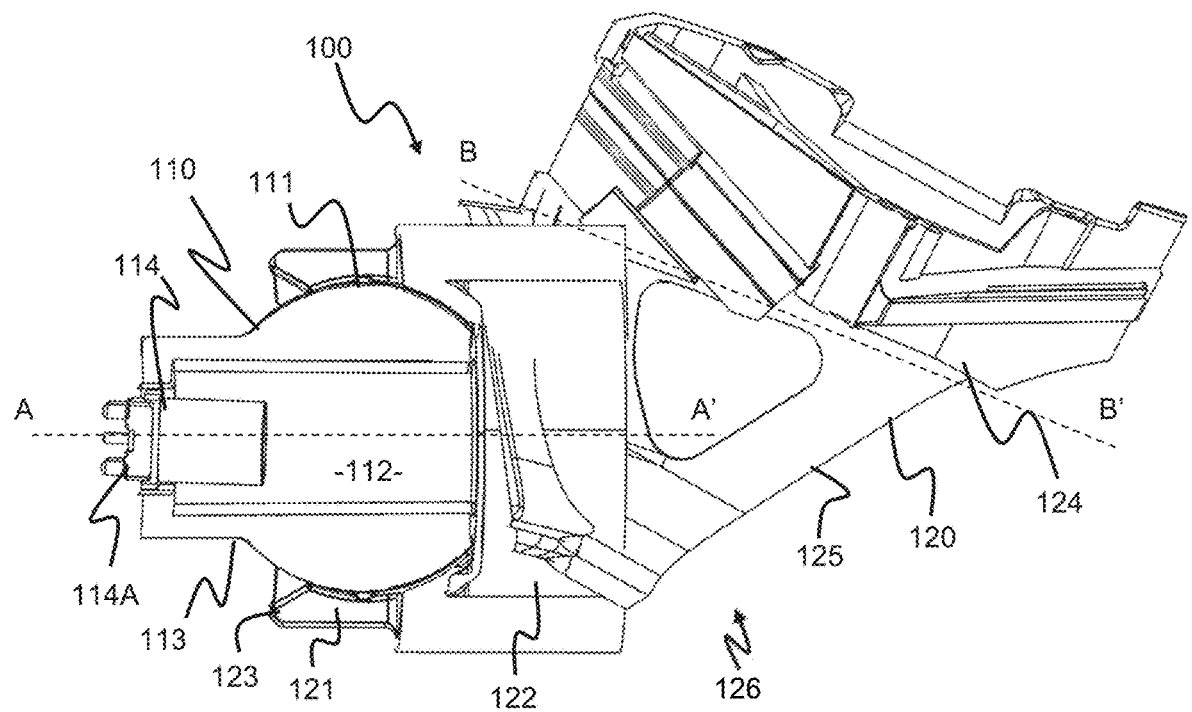
FIG. 2 is a side cross-sectional view of the articulated stand of FIG. 1.

FIG. 2 shows a cross-section view of the articulated stand 100 alone (i.e., without the rearview mirror 10). The articulated stand 100 has a first part 110 and a second part 120 defining together a ball joint. The first part 110 may hold or include the rearview mirror 10 and/or the electronic device while the second part 120 may be fixed on a fixing surface (not shown). Consequently, the ball joint may allow to move the electronic device with regard to the second part and said fixing surface.

The first part 110 has a body defining a ball pivot 111, a chamber 112 through the body and a neck portion 113. The chamber 112 accommodates at least partially a connector 114 that may receive a cable connector to provide power supply and/or data transfer to the electronic device. The chamber 112 has thus a first extremity closed by the connector 114 and an open second extremity opposite to the first extremity. The chamber 112 has preferably a linear inside volume. For example, the chamber may be cylindrical and/or may have a cyclic, square, rectangular or octagonal cross section. In addition, the chamber 112 may have internal protrusions or grooves in order to permanently or removably fix or snap-fit the connector 114, a cable connector or a cable plugged to the connector 114.

The connector 114 is thus at least partially introduced into the chamber 112 in order to accept a cable connector that can be introduced through the chamber (not shown in FIG. 2). One extremity 114A of the connector 114 may protrude from the chamber 112 in order to allow the connection of the connector 114 with the electronic device though a Printed Circuit Board (PCB) or another cable (not shown in FIG. 2). The connector 114 may be fixed to the first part 110, for example snap-fitted to the chamber 112.

The second part 120 has a ball housing portion 121, a passage 122, an edge 123 opposite to the passage 122 and a fixing portion 124. The ball housing portion 121 receives the ball pivot 111 to form the ball joint. The passage 122 is located beside or nearby the ball housing portion 121 and is opened on one side on the chamber 112 and on the other side on an outside. For example, the passage 122 may be aligned on a same longitudinal axis A-A' with the chamber 112, for example in a straight position of the ball joint.

The passage 122 is linked to the fixing portion 124 thanks to two opposite arms 125 (only one visible in FIG. 2) and the fixing portion 124 is remote from the passage 122. For example, the fixing portion 124 has a longitudinal axis B-B' that may be parallel to a longitudinal axis of the fixing surface and which is offset with regard to the longitudinal axis of the chamber 112 and/or of the passage 122. For example, each longitudinal axis may be in a different plane and/or the longitudinal axes may form an angle of 10 to 60°. This may contribute to the definition of a free space 126 between the ball housing portion 121 and the fixing portion 124, as visible in FIG. 2.

The opposite arms 125 may have one or several windows in order to reduce weight. Alternatively, only one arm or more than two arms may be provided to fix the fixing portion to the passage.

The ball joint allows a spherical movement of the first part 110 with regard to the second part 120. The edge 123 of the second part 120 may be adapted to abut the neck portion 113 in an extreme position of the ball joint. Consequently, the neck portion 113 and the edge 123 may form a stopper or stopping means to limit a movement of the ball joint.

Figure 3:
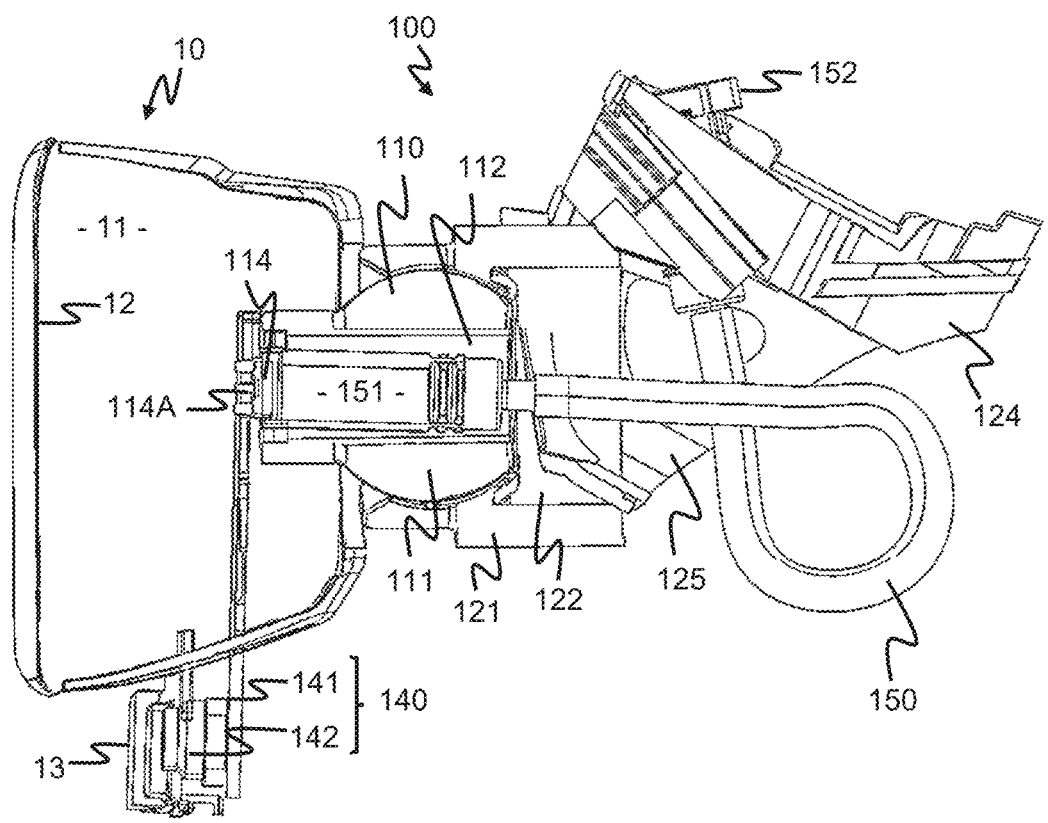
FIG. 3 is a side cross-sectional view of the articulated stand and the rearview mirror according to FIG. 1.
Figure 4:
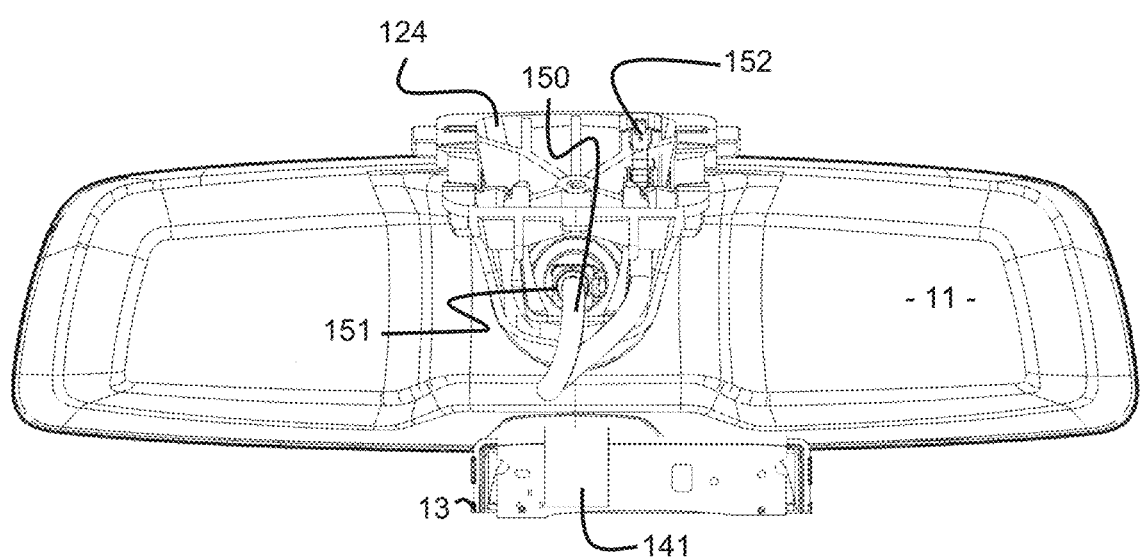
FIG. 4 is a rear elevation view of the articulated stand and the rearview mirror according to FIG. 1.

FIG. 3 shows a cross section of the rearview mirror 10 of FIG. 1 including the articulated stand 100 of FIG. 2. The mirror body 11 is fixed to the first part 110 of the articulated stand 100, for example through a recessed portion of the body surface (see FIG. 4). Alternatively, the mirror body and the first part may be formed as a single part. In addition, the electronic device 140 includes a PCB 141 and a camera 142 which extend from the mirror body 11 and are protected by the front panel 13.

The PCB 141 is fixed to the extremity 114A and is electrically connected to the connector 114 and to the camera 142. The PCB 141 is also fixed to the first part 110. A cable 150 is connected to the PCB 141 through the chamber 112 and the passage 122 thanks to a cable connector 151 plugged to the other extremity of the connector 114. The cable 150 has another cable connector 152 which may be passed or plugged through another passage into the fixing portion 124 of the second part 120 (not visible in FIG. 3, see FIG. 4) in order to be plugged to another connector (not shown).

The cable 150 is preferably a thick, coaxial cable that may include two, three or more coaxial wires as well as insulation layers and shielding layers. The cable 150 may have a diameter equal or greater than 2.00 mm and a limited flexion radius or minimum bending radius, for example of 25.00 mm for a cable diameter of 2.77 mm.

The cable 150 has preferably a loop between the cable connector 151 and the other cable connector 152, the loop having a radius greater than the minimum bending radius of the cable 150. Preferably, the cable connector 151 may be aligned on a different longitudinal axis than the other cable connector 152. For example, the longitudinal axes of both cable connectors 151, 152 may form an angle between 30 and 130°, preferably 45° to 90°, in order to obtain an optimal loop of the cable 150. The cable connector 151 and the other cable connector 152 may be preferably located in two different vertical planes, in order to facilitate plugging.

The mirror body 11, the first part 110 and the second part 120 may be made from the same or from different materials. Preferably, they are obtained from a rigid material and preferably a rigid plastic such as polycarbonate, polypropylene or acrylonitrile-butadiene-styrene.

During mounting, the first part 110 may be assembled to the second part 120 and the mirror body 11 provided with the electronic device may be assembled to the first part 110. The assembly including the mirror body 11, the first part 110 and the second part 120 may then be fixed to the fixing surface for example inside a vehicle, such as to the windshield or to the interior roof by known fixing means.

Finally, the cable 150 can be connected to the connector 114 by inserting the cable connector 151 through the chamber 112 and the passage 122 and the another cable connector 152 may be plugged to another connector provided for example on or through the fixing surface. Alternatively, the cable can be provided on the articulated stand before mounting it to the fixing surface. Preferably, the cable is connected in order to form a loop.

In use, a car driver may change the position of the mirror body 11 with regards to his eyes in order to obtain an optimal rearview thanks to a movement of the ball joint, as it is known. The first part 110 may thus move with regard to the second part 120 and the cable 150 may bend or extend in order to follow the movement of the first part 110. For example, the cable loop may change position or may have a reduced radius, provided the loop radius is kept above the minimum bending radius of the cable 150. The stopper formed by the neck portion 113 and the edge 123 may limit the movement of the ball joint and thus the change in the cable loop position or radius.

Although the present disclosure has been described and illustrated in detail, it is clearly understood that the same is by way of illustration and example only and is not to be taken by way of limitations, the scope of the present disclosure being limited only by the terms of the appended claims. For example, the free space may be defined by a cavity into the second part and/or may be closed (i.e., define an inside volume of the second part). The passage of the second part may be aligned on an axis slightly offset from the axis of the chamber.

The connector may be aligned on the longitudinal axis of the chamber or slightly offset, for example +/−10°. The electronic device may not be accommodated in the front panel but may be placed through the mirror, for example through a cut into the mirror, or through the mirror body. More than one electronic device could be held by the first part, for example an interior camera, an outside camera, a light sensor and a screen that may be accommodated in or protrude from the mirror body.

What is claimed is:

1. An articulated stand comprising:
   a first part comprising a ball pivot, the first part configured for holding an electronic device, the ball pivot comprising:
      a chamber defined through the ball pivot; and
      a connector, the connector accommodated at least partially in the chamber, the connector configured to electrically connect with a cable connector;
   a second part comprising:
      a ball housing portion, the ball housing portion receiving the ball pivot to form a ball joint and having a first longitudinal axis through a longitudinal center of the ball housing portion; and
      a fixing portion adapted to be fixed on a fixing surface, the fixing portion having a second longitudinal axis that is parallel with the fixing surface, the second longitudinal axis being offset at an angle between ten and sixty degrees to the first longitudinal axis; and
   a cable including the cable connector, at least part of the cable being positioned in a free space exterior to the second part that is defined by, located between, and at least partially enclosed by both the ball housing portion and the fixing portion.

2. The articulated stand according to claim 1, wherein the second part further comprises:
   a passage extending between the chamber of the ball pivot and the free space,
   wherein the passage has at least one of a width or a diameter greater than at least one of a width or a diameter of the chamber, respectively, and
   wherein the passage is configured to receive the cable connector and another part of the cable therethrough to be accommodated in the chamber and the passage regardless of a position of the ball joint, the cable connector being plugged into the connector of the first part through the ball pivot.

3. The articulated stand according to claim 2, wherein the passage is linked to the fixing portion by two opposite arms.

4. The articulated stand according to claim 1, wherein the cable defines a loop between the cable connector and another cable connector, the loop being located in the free space.

5. The articulated stand according to claim 4, wherein the cable connector is fully accommodated into the chamber of the ball pivot.

6. The articulated stand according to claim 1, wherein the chamber of the ball pivot is linear.

7. The articulated stand according to claim 1, wherein at least one of the ball pivot or the ball housing portion further comprises:
   a stopper configured for limiting a relative movement of the first part with regard to the second part.

8. The articulated stand according to claim 1, further comprising:
   the electronic device, wherein the electronic device is fixed to the first part.

9. The articulated stand according to claim 8, wherein the electronic device comprises:
   a camera.

10. An articulated stand comprising:
    a first part comprising:
       a ball pivot, the ball pivot comprising:
          a chamber defined through the ball pivot; and
          a connector, the connector accommodated at least partially in the chamber, the connector configured to electrically connect with a cable connector;
       a rearview mirror body connected to the ball pivot; and
       a rearview mirror connected to the rearview mirror body, the rearview mirror further comprising an electronic device;
    a second part, the second part comprising:
       a ball housing portion, the ball housing portion receiving the ball pivot to form a ball joint and having a first longitudinal axis through a longitudinal center of the ball housing portion; and
       a fixing portion adapted to be fixed on a fixing surface, the fixing portion having a second longitudinal axis that is parallel with the fixing surface, the second longitudinal axis being offset at an angle between ten and sixty degrees to the first longitudinal axis; and
    a cable including the cable connector, at least part of the cable being positioned in a free space exterior to the second part that is defined by, located between, and at least partially enclosed by both the ball housing portion and the fixing portion.

11. The articulated stand according to claim 10, wherein the second part further comprises:
    a passage extending between the chamber of the ball pivot and the free space,
    wherein the passage has at least one of a width or a diameter greater than at least one of a width or a diameter of the chamber, respectively, and
    wherein the passage is configured to receive the cable connector and another part of the cable therethrough to be accommodated in the chamber and the passage, regardless of a position of the ball joint, the cable connector being plugged into the connector of the first part through the ball pivot.

12. The articulated stand according to claim 11, wherein the passage is linked to the fixing portion by two opposite arms.

13. The articulated stand according to claim 10, wherein the cable defines a loop between the cable connector and another cable connector, the loop being located in the free space.

14. The articulated stand of claim 10, wherein the electronic device comprises:
    a camera.

15. The articulated stand of claim 10, wherein the fixing portion of the second part is configured to be fixed to a windshield or an interior roof of a vehicle.

16. The articulated stand according to claim 1, wherein the second part further comprises two opposite arms fixing the fixing portion to the passage and further defining the free space.

17. The articulated stand according to claim 10, wherein the second part further comprises two opposite arms fixing the fixing portion to the passage and further defining the free space.

18. The articulated stand according to claim 13, wherein the cable connector is fully accommodated into the chamber of the ball pivot.

19. The articulated stand according to claim 10, wherein the chamber of the ball pivot is linear.

20. The articulated stand according to claim 10, wherein at least one of the ball pivot or the ball housing portion further comprises a stopper configured for limiting a relative movement of the first part with regard to the second part.

* * * * *